(12) United States Patent
Tomeno et al.

(10) Patent No.: US 8,361,916 B2
(45) Date of Patent: Jan. 29, 2013

(54) OPTICAL GLASS AND PREFORMS FOR PRECISION PRESS MOLDING AND OPTICAL ELEMENTS MADE BY USING THE GLASS

(75) Inventors: Satoru Tomeno, Tokyo (JP); Jun Sasai, Tokyo (JP); Hiroyuki Ohkawa, Tokyo (JP); Kenji Imakita, Tokyo (JP); Yuki Kondo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 253 days.

(21) Appl. No.: 12/791,913

(22) Filed: Jun. 2, 2010

(65) Prior Publication Data

US 2010/0240516 A1    Sep. 23, 2010

Related U.S. Application Data

(63) Continuation of application No. PCT/JP2008/066222, filed on Sep. 9, 2008.

(30) Foreign Application Priority Data

Dec. 6, 2007   (JP) ................................. 2007-316425

(51) Int. Cl.
  *C03C 3/068* (2006.01)
  *C03C 3/066* (2006.01)
  *C03C 3/155* (2006.01)
(52) U.S. Cl. ................. 501/78; 501/79; 501/50; 501/51
(58) Field of Classification Search .................... 501/50, 501/51, 78, 79
See application file for complete search history.

(56) References Cited

U.S. PATENT DOCUMENTS

| | | | |
|---|---|---|---|
| 2003/0211929 A1 | 11/2003 | Hayashi et al. | |
| 2005/0204776 A1* | 9/2005 | Hayashi | 65/102 |
| 2005/0272589 A1 | 12/2005 | Shimizu | |
| 2008/0220961 A1* | 9/2008 | Uehara et al. | 501/78 |
| 2009/0093357 A1* | 4/2009 | Sasai et al. | 501/78 |
| 2009/0233782 A1* | 9/2009 | Sasai | 501/78 |
| 2009/0312172 A1* | 12/2009 | Nakata | 501/78 |

FOREIGN PATENT DOCUMENTS

| | | |
|---|---|---|
| CN | 1418836 | 5/2003 |
| CN | 1669966 A | 9/2005 |
| CN | 101014546 | 8/2007 |
| CN | 101029938 A | 9/2007 |
| JP | 2003-201143 | 7/2003 |
| JP | 2003-267748 | 9/2003 |
| JP | 2006-016293 | 1/2006 |
| JP | 2006-016295 | 1/2006 |
| WO | WO 2005118498 A1 * | 12/2005 |
| WO | WO 2006093062 A1 * | 9/2006 |
| WO | WO 2007099857 A1 * | 9/2007 |
| WO | WO 2007145173 A1 * | 12/2007 |
| WO | WO 2008016164 A1 * | 2/2008 |
| WO | WO 2008032742 A1 * | 3/2008 |
| WO | WO 2009017035 A1 * | 2/2009 |

OTHER PUBLICATIONS

U.S. Appl. No. 12/790,141, filed May 28, 2010, Tomeno, et al.
Office Action issued Feb. 13, 2012 in Chinese Patent Application No. 200880119171.9 (with English translation).

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

An object of the invention is to provide an optical glass for precision press having optical properties of a high refractive index and a low dispersion property and having a low molding temperature, a high devitrification resistance, an excellent molding property, and a small specific gravity. The optical glass of the invention contains, in terms of % by mass on the basis of oxides, respective components of $B_2O_3$: 10 to 20%, $SiO_2$: 0.5 to 12%, $La_2O_3$: 25 to 50%, $Gd_2O_3$: 0 to 20%, $Y_2O_3$: 0 to 20%, provided that $La_2O_3+Gd_2O_3+Y_2O_3$: 35 to 60%, ZnO: 5 to 20%, $Li_2O$: 0.2 to 3%, $ZrO_2$: 0 to 0.5%, $Ta_2O_5$: 3 to 18% and $WO_3$: 3 to 20%, and has optical constants of a refractive index $n_d$ of 1.84 to 1.86 and an Abbe number $v_d$ of 37 to 42 and a glass transition point ($T_g$) of 630° C. or lower.

20 Claims, No Drawings

OPTICAL GLASS AND PREFORMS FOR PRECISION PRESS MOLDING AND OPTICAL ELEMENTS MADE BY USING THE GLASS

CROSS REFERENCE TO RELATED APPLICATION

This application is a continuation of PCT/JP08/066,222, filed on Sep. 9, 2008, and claims priority to Japanese Patent Application No. 2007-316425, filed on Dec. 6, 2007.

TECHNICAL FIELD

The present invention relates to an optical glass having a high refractive index and a low dispersion property, and a preform for precision press molding and an optical element using the same.

BACKGROUND ART

Recently, since highly precise and compact digital cameras, camera-equipped mobile-phones, and the like have been popularized, demands for weight saving and miniaturization of optical systems have been rapidly increased. In order to meet these demands, an optical design using a highly functional glass aspheric lens becomes the mainstream. In particular, a large-aperture aspheric lens using a glass showing a high refractive index and a low dispersion characteristic is important for the optical design.

The highly functional glass aspheric lens is produced by a molding method which forms an optical surface directly by press molding and does not require grinding and polishing steps. In the molding method, a glass molding preform is pressed under a high temperature. Therefore, the preform and the mold are exposed to a high-temperature and high-pressure environment. Accordingly, it is desired to suppress the glass transition temperature (Tg) and yield point temperature (Ts) of the preform to low values.

As a glass showing a high refractive index and a low dispersion characteristic, a glass containing $B_2O_3$ and $La_2O_3$ as main components is known. However, there have been a problem that the life of a noble metal-based protective film formed on a tungsten carbide (WC)-based mold base metal is short and the durability of the mold for molding does not last long since the molding temperature is generally high, and a problem that a molding cycle is long and thus productivity is low.

In order to solve the above problems, a glass containing, as main components, $Li_2O$ in addition to $B_2O_3$ and $La_2O_3$ is known. However, since it contains a large amount of rare metal elements such as $La_2O_3$, there is a problem that a stable glass is not obtained when it is intended to increase the refractive index.

In order to solve the above problems, a glass containing $B_2O_3$—$SiO_2$—$La_2O_3$—$Gd_2O_3$—$ZnO$—$Li_2O$—$ZrO_2$ as main components has been proposed in Patent Document 1. However, a composition of a high-refractive-index glass having a refractive index of 1.79 or more is not specifically disclosed in Examples. It also involves a problem that the molding temperature is high.

Further, Patent Documents 2, 3, and 4 propose optical glasses for mold press molding containing $B_2O_3$—$SiO_2$—$La_2O_3$—$ZnO$—$Li_2O$—$ZrO_2$—$Ta_2O_5$ as main components and having $n_d$ of 1.84 or more, an Abbe number $v_d$ of 35 or more, Tg of 630° C. or lower. However, the glasses excessively contain $Ta_2O_5$ and $Gd_2O_3$, so that they involve problems when trying to achieve low specific gravity, high refractive index, and cost saving.

Patent Document 1: JP-2003-201143
Patent Document 2: JP-2003-267748
Patent Document 3: JP-2006-016293
Patent Document 4: JP-2006-016295

DISCLOSURE OF THE INVENTION

An object of the invention is to provide an optical glass for precision press having optical properties of a high refractive index and a low dispersion property and having a low molding temperature, a high devitrification resistance, an excellent molding property, and a small specific gravity.

MEANS FOR SOLVING THE PROBLEMS

The optical glass according to a first embodiment of the invention contains, in terms of % by mass on the basis of oxides, respective components of $B_2O_3$: 10 to 20%, $SiO_2$: 0.5 to 12%, $La_2O_3$: 25 to 50%, $Gd_2O_3$: 0 to 20%, $Y_2O_3$: 0 to 20%, provided that $La_2O_3+Gd_2O_3+Y_2O_3$: 35 to 60%, ZnO: 5 to 20%, $Li_2O$: 0.2 to 3%, $ZrO_2$: 0 to 0.5%, $Ta_2O_5$: 3 to 18% and $WO_3$: 3 to 20%, and has optical constants of a refractive index $n_d$ of 1.84 to 1.86 and an Abbe number $v_d$ of 37 to 42, and a glass transition point ($T_g$) of 630° C. or lower.

The optical glass according to a second embodiment of the invention contains, in terms of % by mol on the basis of oxides, respective components of $B_2O_3$: 20 to 40%, $SiO_2$: 1 to 30%, $La_2O_3$: 10 to 25%, ZnO: 10 to 35%, $Ta_2O_5$: 1 to 8%, $Li_2O$: 0.5 to 15%, $WO_3$: 1 to 15%, $Gd_2O_3$: 0 to 10%, $Y_2O_3$: 0 to 15%, and $ZrO_2$: 0 to 0.5%, wherein the content of $La_2O_3+Gd_2O_3+Y_2O_3$ being 15 to 30%, and has a refractive index $n_d$ of 1.84 to 1.86, an Abbe number $v_d$ of 37 to 42, and a glass transition point (Tg) of 630° C. or lower.

ADVANTAGES OF THE INVENTION

The optical glass of the invention (hereinafter referred to as the present glass) has a high refractive index and has a refractive index $n_d$ with respect to the d line of 1.84 to 1.86 and an Abbe number $v_d$ of 37 to 42.

Moreover, the present glass has a specific gravity of 5.34 or less, which is small as a glass material of the optical constant region and thus can contribute to weight saving of optical systems.

BEST MODE FOR CARRYING OUT THE INVENTION

The reasons for setting the ranges of the respective components of the present glass will be described below. In the following description, the content means a content on the basis of total amount of the oxides contained in the composition.

In the present glass, $B_2O_3$ is a component which forms a glass skeleton and lowers the liquidus temperature $T_L$, and is an essential component. In the present glass, the content of $B_2O_3$ is 10 to 20% by mass. When the content of $B_2O_3$ is less than 10% by mass, vitrification becomes difficult, which is hence not preferred. In order to obtain a glass having a good devitrification resistance, the content of $B_2O_3$ is controlled to 10% by mass or more. The content of $B_2O_3$ is more preferably 11% by mass or more and further preferably 12% by mass or more. When the content of $B_2O_3$ is 13% by mass or more, the liquidus temperature decreases and also the Abbe number can be increased, which is hence particularly preferred.

On the other hand, in the present glass, when the content of $B_2O_3$ exceeds 20% by mass, there is a concern that the refractive index $n_d$ decreases or that the chemical durability such as water resistance deteriorates. In the present glass, the content of $B_2O_3$ is 20% by mass or less. In the case where it is intended to increase the refractive index $n_d$, the content of $B_2O_3$ is preferably 19% by mass and the content of $B_2O_3$ is more preferably 18% by mass. In this connection, the content of $B_2O_3$ in the present glass is 20 to 40% by mol in terms of % by mol.

The range of the content in terms of % by mol and the range of the content in terms of % by mass have not always mapping relation and there is a case where ranges which do not overlap each other may be present. In the invention, ranges which overlap each other are the best ranges. However, needless to say, the advantageous effects of the invention are exhibited even in the ranges which do not overlap each other (the same shall apply hereinafter).

In the present glass, ZnO is a component which stabilizes the glass and lowers the molding temperature and the melting temperature, and is an essential component. In the present glass, the content of ZnO is 5 to 20% by mass. When the content of ZnO is less than 5% by mass, there is a concern that the glass becomes unstable or that the molding temperature goes up. The content of ZnO is 5% by mass or more. The content of ZnO of 6% by mass or more is further preferred. On the other hand, in the present glass, when the content of ZnO exceeds 20% by mass, the stability of the glass becomes deteriorated and there is a concern of deterioration in chemical durability. The content of ZnO is preferably 19% by mass or less and the content of ZnO is further preferably 18% by mass or less. In this connection, the content of ZnO in the present glass is 10 to 35% by mol in terms of % by mol.

In the present glass, $La_2O_3$ is a component which increases the refractive index with respect to the d line (587.6 nm) (hereinafter referred to as refractive index $n_d$) and the Abbe number $v_d$ and improves the chemical durability, and is an essential component. In the present glass, the content of $La_2O_3$ is 25 to 50% by mass. When the content of $La_2O_3$ is less than 25% by mass, there is a concern that the refractive index $n_d$ becomes too low. The content of $La_2O_3$ is preferably 28% by mass or more and further preferably 30% by mass or more.

On the other hand, when the content of $La_2O_3$ exceeds 50% by mass, vitrification tends to be difficult and there is a concern that the molding temperature goes up or the liquidus temperature $T_L$ goes up. The content of $La_2O_3$ is preferably 48% by mass or less and more preferably 46% by mass or less. In this connection, the content of $La_2O_3$ in the present glass is 10 to 25% by mol in terms of % by mol.

In the present glass, $ZrO_2$ is not an essential component and the content is also limited to 0 to 0.5% by mass. The present inventors found that, in the case where the content of $ZrO_2$ exceeds 0.5% by mass, the content of $La_2O_3$ cannot be increased if the content of $Ta_2O_5$ is small, and a stable glass cannot be obtained unless 20% by mass or more of $Gd_2O_3$ is contained. Also, the inventors found that, by controlling the content of $ZrO_2$ to 0.5% by mass or less, it becomes possible to increase the content of $La_2O_3$ while decreasing the content of $Gd_2O_3$, which has a large formula weight among the rare metal components, and the content of $Ta_2O_5$, which is a rare and expensive raw material.

Namely, since it is important for obtaining a low-cost and low-specific-gravity optical glass for precision press having a high refractive index and low dispersion to limit the content of $ZrO_2$ to 0.5% by mass or less, the content of $ZrO_2$ is limited to 0 to 0.5% by mass. Furthermore, it is desirable to contain substantially no $ZrO_2$. In this connection, the content of $ZrO_2$ in the present glass is 0 to 0.5% by mol in terms of % by mol. As mentioned above, since it is important for obtaining a low-cost and low-specific-gravity optical glass for precision press having a high refractive index and low dispersion to limit the content of $ZrO_2$ to 0.5% by mol or less, the content of $ZrO_2$ is limited to 0 to 0.5% by mol.

In the present glass, $Gd_2O_3$ is a component which increases the refractive index $n_d$ and the Abbe number $v_d$, and improves the stability of the glass by the simultaneous presence of $La_2O_3$. However, since gadolinium has a large atomic weight as compared with lanthanum having the same effect, increase in specific gravity is a problem. Thus, the introduction of a large amount thereof is disadvantageous for weight saving. Therefore, in the present glass, the content of $Gd_2O_3$ is limited to 0 to 20% by mass. In order to achieve a high refractive index and stabilize the glass, the content of $Gd_2O_3$ is preferably 1% by mass (0.5% by mol) or more and the content of $Gd_2O_3$ is more preferably 2% by mass (1% by mol) or more.

On the other hand, when the content of $Ga_2O_3$ exceeds 20% by mass (8% by mol), there is a concern that the liquidus temperature goes up and $n_d$ lowers. Therefore, the content of $Gd_2O_3$ is preferably 18% by mass (7% by mol) or less and more preferably 16% by mass (6.5% by mol) or less. In this connection, the content of $Ga_2O_3$ in the present glass is 0 to 10% by mol in terms of % by mol. As mentioned above, the content of $Gd_2O_3$ is preferably 0.5% by mol or more and further preferably 1% by mol or more. Also, the content of $Gd_2O_3$ is preferably 7% by mol or less and further preferably 6.5% by mol or less.

In the present glass, $Y_2O_3$ is a component which increases the refractive index $n_d$ and the Abbe number $v_d$, and improves the stability of the glass as in the cases of $La_2O_3$ and $Gd_2O_3$. In the present glass, the content of $Y_2O_3$ is 0 to 20% by mass. The content of $Y_2O_3$ is preferably 1% by mass or more and the content of $Y_2O_3$ is further preferably 2% by mass or more. On the other hand, when the content of $Y_2O_3$ exceeds 20% by mass, there is a concern that the liquidus temperature goes up and $n_d$ lowers. Therefore, the content of $Y_2O_3$ is preferably 12% by mass or less and further preferably 10% by mass or less. In this connection, the content of $Y_2O_3$ in the present glass is 0 to 15% by mol in terms of % by mol.

In the present glass, the total content of $La_2O_3$, $Gd_2O_3$, and $Y_2O_3$ is preferably 35 to 60% by mass. When the total content is less than 35% by mass, there is a concern that the refractive index $n_d$ lowers or the chemical durability deteriorates. The total content is preferably 40% by mass or more, and the total amount is further preferably 41% by mass or less. The total amount is particularly preferably 43% by mass or more. On the other hand, when the total content exceeds 60% by mass, the vitrification tends to be difficult and there is a concern that the molding temperature goes up or the liquidus temperature $T_L$ goes up. The total content is preferably 58% by mass or less and the total content is further preferably 55% by mass or less. In this connection, the total content of $La_2O_3$, $Gd_2O_3$ and $Y_2O_3$ in the present glass is 15 to 30% by mol in terms of % by mol.

In the present glass, $Li_2O$ is a component which stabilizes the glass and lowers the precision press molding temperature and melting temperature, and is an essential component. In the present glass, the content of $Li_2O$ is 0.2 to 3% by mass. When the content of $Li_2O$ is less than 0.2% by mass, there is a concern that the molding temperature becomes too high.

The content of $Li_2O$ is preferably 0.3% by mass or more and the content of $Li_2O$ is further preferably 0.5% by mass or more.

On the other hand, when the content of $Li_2O$ exceeds 3% by mass, devitrification is apt to occur and there is a concern that the chemical durability deteriorates or volatilization of components upon melting becomes vigorous. The content of $Li_2O$ is preferably 2.5% by mass or less, and the content of $Li_2O$ is further preferably 2% by mass or less. In this connection, the content of $Li_2O$ is 0.5 to 15% by mol in terms of % by mol.

In the present glass, $Ta_2O_5$ is a component which stabilizes the glass, improves the refractive index $n_d$, and suppresses devitrification upon molding from a molten solution, and is an essential component. In the present glass, the content of $Ta_2O_5$ is 3 to 18% by mass. When the content of $Ta_2O_5$ is too small, there is a concern that the refractive index $n_d$ becomes too low or the liquidus temperature $T_L$ becomes too high. Therefore, the content of $Ta_2O_5$ is 3% by mass or more. The content of $Ta_2O_5$ is more preferably 5% by mass or more, and further preferably 8% by mass or more. On the other hand, when the content of $Ta_2O_5$ is too large, the molding temperature becomes high and the specific gravity becomes great. Furthermore, since $Ta_2O_5$ is a rare element and is limited as resources, its use in a large amount is not desirable. Moreover, since it is an expensive component, the use leads to increase in cost. Therefore, the content of $Ta_2O_5$ is 18% by mass or less. The content of $Ta_2O_5$ is more preferably 15% by mass or less and further preferably 13% by mass or less. In this connection, the content of $Ta_2O_5$ in the present glass is 1 to 8% by mol in terms of % by mol.

Furthermore, from the viewpoint of reducing the specific gravity, the total content of $Gd_2O_3$ and $Ta_2O_5$ is preferably 25% by mass or less, more preferably 23% by mass or less, and further preferably 20% by mass or less. In this connection, the total content of $Gd_2O_3$ and $Ta_2O_5$ is preferably 12% by mol or less.

In the present glass, $WO_3$ is a component which is effective for stabilization of the glass, improvement of the refractive index $n_d$, and suppression of devitrification upon high-temperature molding, and is an essential component. In the present glass, the content of $WO_3$ is 3 to 20% by mass. When the content of $WO_3$ is less than 3% by mass, there is a concern that the refractive index $n_d$ lowers and the liquidus temperature $T_L$ goes up. The content of $WO_3$ is preferably 4% by mass or more, and the content of $WO_3$ is further preferably 5% by mass or more. On the other hand, when the content of $WO_3$ exceeds 20% by mass, the Abbe number becomes small, failing to obtain the objective low dispersion characteristic. Therefore, the content of $WO_3$ is 18% by mass or less, and the content of $WO_3$ is further preferably 16% by mass or less. In this connection, the content of $WO_3$ in the present glass is 1 to 15% by mol in terms of % by mol.

In the present glass, $SiO_2$ is a component which is effective for stabilization of the glass and suppression of devitrification upon high-temperature molding, and is an essential component. In the present glass, the content of $SiO_2$ is 0.5 to 12% by mass. When the content of $SiO_2$ exceeds 12% by mass, there is a concern that the molding temperature becomes too high or the refractive index $n_d$ becomes too low. The content of $SiO_2$ is preferably 12% by mass or less and more preferably 10% by mass or less.

On the other hand, in the case where it is intended to suppress the devitrification upon high-temperature molding or it is intended to adjust the viscosity, the content of $SiO_2$ is controlled to 0.5% by mass or more. The content of $SiO_2$ is preferably 1% by mass or more, and the content of $SiO_2$ is more preferably more than 2% by mass. In this connection, the content of $SiO_2$ in the present glass is 1 to 30% by mol in terms of % by mol.

In the present glass, $TiO_2$ is not an essential component but may be present in a content of 0 to 5% by mass for the purpose of stabilization of the glass, improvement of the refractive index, suppression of devitrification upon high-temperature molding, and the like. When the content of $TiO_2$ exceeds 5% by mass, the Abbe number $v_d$ becomes small, so that the objective low dispersion characteristic cannot be obtained. Furthermore, since the transmittance in a near ultraviolet region decreases, there is a concern that the characteristics as an optical glass are impaired. Therefore, the content of $TiO_2$ is more preferably 3% by mass or less. In this connection, the content of $TiO_2$ in the present glass is 0 to 8% by mol in terms of % by mol.

In the present glass, $Nb_2O_5$ is not an essential component but may be present in a content of 0 to 5% by mass for the purpose of stabilization of the glass, improvement of the refractive index, suppression of devitrification upon high-temperature molding, and the like. When the content of $Nb_2O_5$ exceeds 5% by mass, there is a concern that the Abbe number $v_d$ becomes too small or the liquidus temperature goes up. Therefore, the content of $Nb_2O_5$ is preferably 5% by mass or less. In this connection, the content of $Nb_2O_5$ is 0 to 3% by mol in terms of % by mol.

In the present glass, $Yb_2O_3$ is not an essential component but may be present in a content of 0 to 10% by mass for the purpose of improvement of the refractive index, suppression of devitrification upon high-temperature molding, and the like. When the content of $Yb_2O_3$ exceeds 10% by mass, there is a concern that the glass becomes unstable, the molding temperature becomes too high, or the specific gravity becomes too great. Therefore, the content of $Yb_2O_3$ is preferably 5% by mass or less. It is more preferred that the glass does not contain $Yb_2O_3$. In this connection, the content of $Yb_2O_3$ if contained in the present glass is preferably 8% by mol or less.

In the present glass, each of $Al_2O_3$, $Ga_2O_3$ and $GeO_2$ is not an essential component but each may be present in a content of 0 to 10% by mass for the purpose of stabilization of the glass, adjustment of the refractive index, or the like. When the contents of $Al_2O_3$, $Ga_2O_3$ and $GeO_2$ exceed 10% by mass, there is a concern that the Abbe number $v_d$ becomes too low. The contents of $Al_2O_3$, $Ga_2O_3$ and $GeO_2$ are more preferably 8% by mass or less and further preferably 6% by mass or less. Further, since $Ga_2O_3$ and $GeO_2$ are very rare and expensive components, they are desirably not present. In this connection, the content of each of $Al_2O_3$, $Ga_2O_3$ and $GeO_2$ in the present glass is 0 to 8% by mol in terms of % by mol.

In the present glass, each of BaO, SrO, CaO and MgO is not an essential component but each may be present in a content of 0 to 15% by mass for the purpose of stabilization of the glass, increase in the Abbe number $v_d$, lowering of the molding temperature, decrease in the specific gravity, or the like. When the content of each of BaO, SrO, CaO and MgO exceeds 15% by mass, there is a concern that the glass becomes unstable or the refractive index $n_d$ lowers. In this connection, in the case where the present glass contains BaO, SrO, CaO and/or MgO, the respective content is preferably 30% by mol or less.

The present glass substantially consists of the above components but may contain the other components within the range that does not impair the objects of the present invention. In the case where the glass contains such components, the total content of the components is preferably 10% by mass (10% by mol) or less, more preferably 8% by mass (10% by mol) or less, and further preferably 6% by mass (6% by mol) or 5% by mass (5% by mol) or less. In this connection, the total content of the other components is, as mentioned above, preferably 10% by mol or less, more preferably 8% by mol or less, and further preferably 6% by mol or 5% by mol or less in terms of % by mol.

For example, for the purpose of refining or the like, the present glass may contain $Sb_2O_3$ in a content of 0 to 1% by mass (0 to 1% by mol). In this connection, the content of $Sb_2O_3$ is 0 to 1% by mol in terms of % by mol.

Moreover, for the purpose of further stabilization of the glass, adjustment of the refractive index $n_d$, adjustment of the specific gravity, lowering of the melting temperature, and the like, the glass may contain each component of $Na_2O$, $K_2O$, $Rb_2O$ or $Cs_2O$ in a total content of 0 to 5% by mass. When the total content of each component of $Na_2O$, $K_2O$, $Rb_2O$ or $Cs_2O$ exceeds 5% by mass, there is a concern that the glass becomes unstable, the refractive index $n_d$ lowers, the hardness decreases, or the chemical durability deteriorates. In this connection, in the case of putting importance on the hardness and the chemical durability, it is preferred that the glass does not substantially contain any component of $Na_2O$, $K_2O$, $Rb_2O$ or $Cs_2O$. Here, the term "does not substantially contain" means that the components are not positively added, and this does not preclude components included as impurities in the other components (the same shall apply hereinafter). In this connection, the total content of each component of $Na_2O$, $K_2O$, $Rb_2O$ or $Cs_2O$ is 0 to 5% by mol in terms of % by mol.

In the present glass, optional components other than the above components can be selected depending on respective required properties. For example, in the case of putting importance on a high refractive index $n_d$ and a low glass transition point $T_g$, the glass may contain SnO in a content of 0 to 4% by mass (0 to 4% by mol). Similarly, in the case of putting importance on a high refractive index, the glass may contain $TeO_2$ and/or $Bi_2O_3$ solely or in combination in an amount of 0 to 6% by mass. When the content of $TeO_2$ and/or $Bi_2O_3$ exceeds 6% by mass, there is a concern that the glass becomes unstable or the transmittance remarkably decreases. However, in the case where it is intended to increase the Abbe number $v_d$, it is preferred that the glass does not substantially contain any of $TeO_2$ or $Bi_2O_3$. In this connection, the single or total content of $TeO_2$ and/or $Bi_2O_3$ in the present glass is 0 to 10% by mol in terms of % by mol.

In the present glass, in order to reduce the environmental load, it is preferred that the glass does not substantially contain any of lead (PbO), arsine ($As_2O_3$), thallium ($Tl_2O$), thorium ($ThO_2$), and cadmium (CdO). Further, when the glass contains fluorine, the composition of the optical glass tends to be heterogeneous at the time of melting the glass, since it increases thermal expansion coefficient, adversely affecting mold-releasing property and molding property, and also since the component is easily volatilized. In addition, there is a problem that the durability of the mold such as a releasing film is deteriorated upon precision molding. Therefore, it is preferred that the present glass does not substantially contain fluorine either.

In the present glass, for the reasons of prevention of coloring and the like, it is preferred that the glass does not substantially contain transition metal compounds including $Fe_2O_3$ as a representative (exclusive of $TiO_2$). Even in the case where such compounds are inevitably incorporated by way of raw materials, it is preferred that the total content of the transition metal compounds in the present glass is limited to 0.01% by mass or less.

As optical characteristics of the present glass, the refractive index $n_d$ is preferably 1.84 to 1.86. When the refractive index $n_d$ is 1.84 or more, the glass is suitable for miniaturization and decrease in thickness of lenses, which is hence preferred. The refractive index $n_d$ is more preferably 1.845 or more. On the other hand, when the refractive index $n_d$ exceeds 1.86, the Abbe number becomes too small and also the other thermal physical properties are adversely affected, which is hence not preferred. The refractive index $n_d$ is more preferably 1.855 or less. The Abbe number $v_d$ of the present glass is preferably 37 to 42. When the Abbe number $v_d$ is more than 37, the glass has a low dispersion characteristic, which is hence preferred. Moreover, when the Abbe number $v_d$ is 42 or less, the glass has a good devitrification resistance, which is hence preferred.

The glass transition temperature $T_g$ of the present glass is 630° C. or lower. When the glass transition temperature $T_g$ is 630° C. or lower, the deterioration of the mold upon precision press molding hardly occurs, which is hence preferred. The glass transition temperature $T_g$ is more preferably 625° C. or lower, more preferably 620° C. or lower, and particularly preferably 600° C. or lower.

The specific gravity of the present glass is preferably 5.34 or less. When it exceeds 5.34, in the case where the glass is used as an optical element such as an optical lens, the mass of the optical system becomes too large and thus there is a concern that the driving system of the lens bears a considerable load. Therefore, the specific gravity is desirably 5.34 or less and the specific gravity is more preferably 5.32 or less. A specific gravity of 5.24 or less is further preferred.

The liquidus temperature $T_L$ of the present glass is preferably 1200° C. or lower. When the liquidus temperature $T_L$ exceeds 1200° C., the article to be molded tends to be devitrified upon high-temperature molding and the carbon and heat-resistant alloy to be used in a receiving mold for high-temperature molding are deteriorated, which is hence not preferred. The liquidus temperature $T_L$ of the present glass is more preferably 1180° C. or lower, and further preferably 1150° C. or lower. In this connection, the liquidus temperature $T_L$ is defined as a maximum temperature at which no crystals are generated from a glass molten liquid while holding at the temperature for 1 hour.

As the process for producing a preform of the present glass, there may be mentioned, as one example, a process of allowing a molten glass to flow from a tip of a nozzle disposed on a tank to form a gob having a desired mass and receiving it on a mold with surfacing it with nitrogen gas to form a preform having an ellipsoidal, spherical or the like shape, but the process is not limited thereto. Since the present glass has such characteristics as mentioned above, an optical design can be easily performed and the glass is suitable for optical elements, particularly a glass molded aspheric lens.

EXAMPLES

Specific embodiments of the invention will be illustrated with reference to the following Examples (Examples 1 to 17), but the invention is not limited thereto.

As a method for preparing a raw material, the following raw materials were blended so as to obtain a glass having a composition shown in the tables, placed in a platinum crucible, and melted at 1250 to 1350° C. for 2 hours. On this occasion, stirring was carried out with a platinum stirrer for 0.5 hours to homogenize the molten glass. After the homogenized molten glass was drawn off to form a plate, it was maintained at a temperature of $T_g$+10° C. for 4 hours and then gradually cooled to room temperature at a cooling rate of −1° C./min.

As the raw materials, special grade reagents manufactured by Kanto Chemical Co., Ltd. were used for boric acid, aluminum oxide, lithium carbonate, sodium carbonate, zinc oxide, magnesium oxide, calcium carbonate, and barium carbonate. With regard to lanthanum oxide and gadolinium oxide, reagents having a purity of 99.9% manufactured by Shin-Etsu Chemical Co., Ltd. were employed. With regard to tantalum oxide, silicon dioxide, tungsten oxide, and niobium oxide, reagents having a purity of 99.9% or more manufactured by Kojundo Chemical Laboratory Co., Ltd. were used.

With regard to the glass obtained, a refractive index $n_d$ at wavelength 587.6 nm (d line), a refractive index $n_c$ at wavelength 656.3 nm (C line), a refractive index $n_F$ at wavelength 486.1 nm (F line), an Abbe number $v_d$, a glass transition point $T_g$ (unit: ° C.), an yield point At (unit: ° C.), a liquidus temperature $T_L$ (unit: ° C.), and a specific gravity d were measured. The measurement methods thereof are described below.

Thermal characteristics (glass transition point $T_g$, yield point At): A sample processed into a cylindrical shape having a diameter of 5 mm and a length of 20 mm was measured at a temperature-elevating rate of 5° C./minute by means of a thermometric apparatus (manufactured by Bruker AXS Company, trade name: TD5000SA).

Optical constants (refractive index $n_d$, Abbe number $v_d$): A sample processed into a rectangular shape having a side length of 20 mm and a thickness of 10 mm was measured by means of a precision refractometer (manufactured by Kalnew Optical Industries, trade name: KPR-2). The Abbe number $v_d$ was determined according to the equation: $\{(n_d-1)/(n_F-n_C)\}$.

Liquidus temperature $T_L$: A glass processed into a cubic shape having a side length of 10 mm was placed on a platinum dish and allowed to stand in an electric furnace set at a constant temperature for 1 hour. Then, the glass taken out of the furnace was observed under an optical microscope of 100 magnifications, and the maximum temperature where no precipitation of crystals was observed was taken as the liquidus temperature $T_L$.

Specific gravity d: A glass cut off so as to have about 20 g was measured by the Archimedes method using water by means of a specific gravity meter SGM300P manufactured by Shimadzu Corporation.

The measurement and calculation results are shown in tables below. Tables 1 to 3 show Invention Examples in terms of % by mass. Tables 4 to 6 show Invention Examples in terms of % by mol. In the following tables, "La+Gd+Y" represents the total content of $La_2O_3$, $Gd_2O_3$ and $Y_2O_3$, and "Gd+Ta" represents the total content of $Gd_2O_3$ and $Ta_2O_5$.

TABLE 1

|  | ex. 1 | ex. 2 | ex. 3 | ex. 4 | ex. 5 | ex. 6 | ex. 7 |
| --- | --- | --- | --- | --- | --- | --- | --- |
| $B_2O_3$ | 15.2 | 15.4 | 14.2 | 13.0 | 13.0 | 13.1 | 12.8 |
| $SiO_2$ | 4.0 | 4.0 | 3.9 | 5.1 | 5.1 | 5.1 | 5.1 |
| $Li_2O$ | 1.3 | 1.3 | 1.3 | 1.3 | 1.3 | 1.3 | 0.9 |
| ZnO | 8.1 | 8.1 | 7.9 | 7.7 | 7.8 | 7.8 | 11.8 |
| $Y_2O_3$ | 5.0 | 5.0 | 6.5 | 6.6 | 6.6 | 6.6 | 6.1 |
| $La_2O_3$ | 35.9 | 39.6 | 35.8 | 36.1 | 36.1 | 37.3 | 33.8 |
| $Gd_2O_3$ | 8.0 | 4.0 | 8.4 | 8.5 | 8.5 | 8.5 | 7.6 |
| $ZrO_2$ | 0.0 | 0.0 | 0.0 | 0.0 | 0.0 | 0.0 | 0.0 |
| $Ta_2O_5$ | 9.7 | 9.8 | 9.5 | 9.4 | 9.8 | 8.0 | 10.9 |
| $Nb_2O_5$ | 0.0 | 0.0 | 0.0 | 0.0 | 0.0 | 0.0 | 0.0 |
| $WO_3$ | 12.8 | 12.8 | 12.5 | 12.3 | 11.8 | 12.3 | 11.0 |
| Total | 100.0 | 100.0 | 100.0 | 100.0 | 100.0 | 100.0 | 100.0 |
| La + Gd + Y | 48.9 | 48.6 | 50.6 | 51.2 | 51.2 | 52.4 | 47.6 |
| Gd + Ta | 17.7 | 13.8 | 17.9 | 17.8 | 18.3 | 16.5 | 18.6 |
| $n_d$ | 1.8405 | 1.8434 | 1.8490 | 1.8507 | 1.8506 | 1.8493 | 1.8516 |
| $v_d$ | 40.3 | 40.3 | 39.9 | 39.9 | 40.0 | 40.1 | 39.6 |
| $T_g$ | 585 | 586 | 586 | 594 | 594 | 595 | 593 |
| At | 636 | 636 | 638 | 648 | 648 | 649 | 649 |
| $T_L$ | 1100 | 1100 | 1130 | 1130 | 1130 | 1140 | 1120 |
| d | 5.12 | 5.10 | 5.20 | 5.22 | 5.22 | 5.20 | 5.24 |

TABLE 2

|  | ex. 8 | ex. 9 | ex. 10 | ex. 11 | ex. 12 | ex. 13 |
| --- | --- | --- | --- | --- | --- | --- |
| $B_2O_3$ | 12.9 | 12.7 | 13.0 | 12.0 | 13.1 | 12.9 |
| $SiO_2$ | 5.1 | 5.1 | 5.1 | 6.3 | 5.1 | 5.1 |
| $Li_2O$ | 1.1 | 0.7 | 1.0 | 1.1 | 1.1 | 1.2 |
| ZnO | 9.8 | 13.9 | 9.8 | 9.7 | 9.8 | 8.8 |
| $Y_2O_3$ | 6.3 | 5.9 | 6.4 | 3.9 | 2.6 | 6.5 |
| $La_2O_3$ | 35.1 | 32.9 | 35.4 | 37.9 | 39.2 | 35.6 |
| $Gd_2O_3$ | 8.1 | 7.3 | 8.1 | 7.9 | 7.6 | 8.3 |
| $ZrO_2$ | 0.0 | 0.0 | 0.0 | 0.0 | 0.0 | 0.0 |
| $Ta_2O_5$ | 10.8 | 11.7 | 10.9 | 10.6 | 10.7 | 10.8 |
| $Nb_2O_5$ | 0.0 | 0.0 | 1.4 | 0.0 | 0.0 | 0.0 |
| $WO_3$ | 10.8 | 9.8 | 8.9 | 10.6 | 10.8 | 10.8 |
| Total | 100.0 | 100.0 | 100.0 | 100.0 | 100.0 | 100.0 |
| La + Gd + Y | 49.5 | 46.0 | 50.0 | 49.7 | 49.4 | 50.3 |
| Gd + Ta | 18.8 | 19.0 | 19.0 | 18.6 | 18.4 | 19.1 |
| $n_d$ | 1.8499 | 1.8496 | 1.8508 | 1.8501 | 1.8501 | 1.8496 |
| $v_d$ | 40.1 | 39.8 | 40.1 | 40.1 | 40.0 | 40.0 |

TABLE 2-continued

|   | ex. 8 | ex. 9 | ex. 10 | ex. 11 | ex. 12 | ex. 13 |
|---|---|---|---|---|---|---|
| $T_g$ | 593 | 594 | 595 | 597 | 590 | 594 |
| At | 648 | 650 | 650 | 654 | 645 | 641 |
| $T_L$ | 1120 | 1130 | 1150 | 1120 | 1130 | 1130 |
| d | 5.22 | 5.23 | 5.18 | 5.24 | 5.24 | 5.23 |

TABLE 3

|   | ex. 14 | ex. 15 | ex. 16 | ex. 17 |
|---|---|---|---|---|
| $B_2O_3$ | 15.6 | 13.6 | 13.6 | 12.7 |
| $SiO_2$ | 4.1 | 4.9 | 4.9 | 5.0 |
| $Li_2O$ | 1.4 | 0.7 | 0.4 | 1.1 |
| ZnO | 8.2 | 8.5 | 9.7 | 9.7 |
| $Y_2O_3$ | 7.6 | 1.6 | 2.8 | 2.7 |
| $La_2O_3$ | 40.2 | 36.1 | 34.3 | 39.6 |
| $Gd_2O_3$ | 0.0 | 13.7 | 13.5 | 8.0 |
| $ZrO_2$ | 0.0 | 0.0 | 0.0 | 0.0 |
| $Ta_2O_5$ | 9.9 | 10.4 | 10.4 | 10.6 |
| $Nb_2O_5$ | 0.0 | 0.0 | 0.0 | 0.0 |
| $WO_3$ | 13.0 | 10.5 | 10.4 | 10.6 |
| Total | 100.0 | 100.0 | 100.0 | 100.0 |
| La + Gd + Y | 47.8 | 51.4 | 50.6 | 50.3 |
| Gd + Ta | 9.9 | 24.1 | 23.9 | 18.6 |
| $n_d$ | 1.8400 | 1.8503 | 1.8517 | 1.8540 |
| $v_d$ | 40.2 | 40.2 | 40.2 | 39.9 |
| $T_g$ | 583 | 609 | 616 | 590 |
| At | 634 | 653 | 662 | 645 |
| $T_L$ | 1110 | 1120 | 1100 | 1150 |
| d | 5.02 | 5.31 | 5.31 | 5.28 |

TABLE 4

|   | ex. 1 | ex. 2 | ex. 3 | ex. 4 | ex. 5 | ex. 6 | ex. 7 |
|---|---|---|---|---|---|---|---|
| $B_2O_3$ | 33.3 | 33.4 | 31.6 | 28.8 | 28.9 | 28.8 | 27.4 |
| $SiO_2$ | 10.0 | 10.0 | 10.0 | 13.1 | 13.1 | 13.1 | 12.7 |
| $Li_2O$ | 6.8 | 6.7 | 6.7 | 6.6 | 6.6 | 6.6 | 4.4 |
| ZnO | 15.0 | 15.0 | 15.0 | 14.8 | 14.8 | 14.8 | 21.9 |
| $Y_2O_3$ | 3.3 | 3.3 | 4.5 | 4.5 | 4.5 | 4.5 | 4.0 |
| $La_2O_3$ | 16.7 | 18.3 | 17.0 | 17.1 | 17.2 | 17.6 | 15.6 |
| $Gd_2O_3$ | 3.3 | 1.7 | 3.6 | 3.6 | 3.6 | 3.6 | 3.2 |
| $ZrO_2$ | 0.0 | 0.0 | 0.0 | 0.0 | 0.0 | 0.0 | 0.0 |
| $Ta_2O_5$ | 3.3 | 3.3 | 3.3 | 3.3 | 3.4 | 2.8 | 3.7 |
| $Nb_2O_5$ | 0.0 | 0.0 | 0.0 | 0.0 | 0.0 | 0.0 | 0.0 |
| $WO_3$ | 8.3 | 8.3 | 8.3 | 8.2 | 7.9 | 8.2 | 7.1 |
| Total | 100.0 | 100.0 | 100.0 | 100.0 | 100.0 | 100.0 | 100.0 |
| La + Gd + Y | 23.3 | 23.3 | 25.0 | 25.2 | 25.3 | 25.7 | 22.8 |
| Gd + Ta | 6.7 | 5.0 | 6.9 | 6.9 | 7.1 | 6.4 | 6.9 |

TABLE 5

|   | ex. 8 | ex. 9 | ex. 10 | ex. 11 | ex. 12 | ex. 13 |
|---|---|---|---|---|---|---|
| $B_2O_3$ | 28.3 | 27.0 | 28.6 | 26.2 | 29.0 | 28.6 |
| $SiO_2$ | 12.9 | 12.5 | 13.0 | 16.0 | 12.9 | 13.1 |
| $Li_2O$ | 5.5 | 3.4 | 5.5 | 5.4 | 5.5 | 6.0 |
| ZnO | 18.4 | 25.3 | 18.6 | 18.1 | 18.4 | 16.6 |
| $Y_2O_3$ | 4.3 | 3.8 | 4.3 | 2.6 | 1.8 | 4.4 |
| $La_2O_3$ | 16.4 | 14.9 | 16.5 | 17.7 | 18.4 | 16.8 |
| $Gd_2O_3$ | 3.4 | 3.0 | 3.4 | 3.3 | 3.2 | 3.5 |
| $ZrO_2$ | 0.0 | 0.0 | 0.0 | 0.0 | 0.0 | 0.0 |
| $Ta_2O_5$ | 3.7 | 3.9 | 3.7 | 3.7 | 3.7 | 3.8 |
| $Nb_2O_5$ | 0.0 | 0.0 | 0.9 | 0.0 | 0.0 | 0.0 |
| $WO_3$ | 7.1 | 6.2 | 5.5 | 7.0 | 7.1 | 7.2 |
| Total | 100.0 | 100.0 | 100.0 | 100.0 | 100.0 | 100.0 |
| La + Gd + Y | 24.1 | 21.7 | 24.3 | 23.7 | 23.4 | 24.7 |
| Gd + Ta | 7.1 | 6.9 | 7.2 | 7.0 | 6.9 | 7.3 |

TABLE 6

|   | ex. 14 | ex. 15 | ex. 16 | ex. 17 |
|---|---|---|---|---|
| $B_2O_3$ | 33.4 | 31.0 | 30.7 | 28.3 |
| $SiO_2$ | 10.0 | 13.1 | 12.9 | 12.9 |
| $Li_2O$ | 6.7 | 3.6 | 2.3 | 5.5 |
| ZnO | 15.0 | 16.6 | 18.9 | 18.4 |
| $Y_2O_3$ | 5.0 | 1.1 | 1.9 | 1.9 |
| $La_2O_3$ | 18.3 | 17.6 | 16.6 | 18.8 |
| $Gd_2O_3$ | 0.0 | 6.0 | 5.9 | 3.4 |
| $ZrO_2$ | 0.0 | 0.0 | 0.0 | 0.0 |
| $Ta_2O_5$ | 3.3 | 3.8 | 3.7 | 3.7 |
| $Nb_2O_5$ | 0.0 | 0.0 | 0.0 | 0.0 |
| $WO_3$ | 8.3 | 7.2 | 7.1 | 7.1 |
| Total | 100.0 | 100.0 | 100.0 | 100.0 |
| La + Gd + Y | 23.3 | 24.7 | 24.4 | 24.1 |
| Gd + Ta | 3.3 | 9.8 | 9.6 | 7.1 |

While the invention has been described in detail and with reference to specific embodiments thereof, it will be apparent to one skilled in the art that various changes and modifications can be made therein without departing from the spirit and scope thereof.

The present application is based on Japanese Patent Application No. 2007-316425 filed on Dec. 6, 2007, and the contents are incorporated herein by reference.

INDUSTRIAL APPLICABILITY

An optical glass suitable as an optical element for use in optical systems of digital cameras and the like can be provided.

The invention claimed is:

1. An optical glass comprising, in terms of % by mass on the basis of oxides, respective components of
   $B_2O_3$: 10 to 20%,
   $SiO_2$: more than 2 to 12%,
   $La_2O_3$: 25 to 50%,
   $Gd_2O_3$: 0 to 20%,
   $Y_2O_3$: 1 to 20%,
   provided that $La_2O_3+Gd_2O_3+Y_2O_3$: 35 to 60%,
   ZnO: 5 to 20%,
   $Li_2O$: 0.2 to 3%,
   $ZrO_2$: 0 to 0.5%,
   $Ta_2O_5$: 3 to 18% and
   $WO_3$: 3 to 20%, and
   having optical constants of a refractive index $n_d$ of 1.84 to 1.86 and an Abbe number $v_d$ of 37 to 42, and a glass transition point ($T_g$) of 630° C. or lower.

2. The optical glass according to claim 1, wherein the total content of $Gd_2O_3$ and $Ta_2O_5$ is 25% or less in terms of % by mass on the basis of oxides.

3. The optical glass according to claim 2, having a specific gravity of 5.34 or less.

4. The optical glass according to claim 1, having a specific gravity of 5.34 or less.

5. A preform for precision press molding comprising the optical glass according to claim 1.

6. An optical element obtained by precision press molding of the optical glass according to claim 1.

7. The optical glass according to claim 1, wherein $B_2O_3$ is present in the optical glass in an amount of from 13 to 18 mass %, relative to the entire mass of the oxides.

8. The optical glass according to claim 1, wherein ZnO is present in the optical glass in an amount of from 6 to 18 mass %, relative to the entire mass of the oxides.

9. The optical glass according to claim 1, wherein $La_2O_3$ is present in the optical glass in an amount of from 30 to 46 mass %, relative to the entire mass of the oxides.

10. The optical glass according to claim 1, wherein $Gd_2O_3$ is present in the optical glass in an amount of from 2 to 16 mass %, relative to the entire mass of the oxides.

11. The optical glass according to claim 1, wherein $Li_2O$ is present in the optical glass in an amount of from 0.5 to 2 mass %, relative to the entire mass of the oxides.

12. The optical glass according to claim 1, wherein $Y_2O_3$ is present in the optical glass in an amount of from 2 to 10 mass %, relative to the entire mass of the oxides.

13. The optical glass according to claim 1, having a refractive index $n_d$ of 1.845 to 1.855 and a glass transition point ($T_g$) of 600° C. or lower.

14. An optical glass comprising, in terms of % by mol on the basis of oxides, respective components of:
$B_2O_3$: 20 to 40%,
$SiO_2$: 10 to 30%,
$La_2O_3$: 10 to 25%,
ZnO: 10 to 35%,
$Ta_2O_5$: 1 to 8%,
$Li_2O$: 0.5 to 15%,
$WO_3$: 1 to 15%,
$Gd_2O_3$: 0 to 10%,
$Y_2O_3$: 1.1 to 15%, and
$ZrO_2$: 0 to 0.5%,
wherein the content of $La_2O_3+Gd_2O_3+Y_2O_3$ is 15 to 30%, and having a refractive index $n_d$ of 1.84 to 1.86, an Abbe number $v_d$ of 37 to 42, and a glass transition point ($T_g$) of 630° C. or lower.

15. The optical glass according to claim 14, wherein $B_2O_3$ is present in the optical glass in an amount of from 26.2 to 33.4 mol %, relative to the entire moles of the oxides.

16. The optical glass according to claim 14, wherein ZnO is present in the optical glass in an amount of from 14.8 to 25.3 mol %, relative to the entire moles of the oxides.

17. The optical glass according to claim 14, wherein $La_2O_3$ is present in the optical glass in an amount of from 14.9 to 18.8 mol %, relative to the entire moles of the oxides.

18. The optical glass according to claim 14, wherein $Gd_2O_3$ is present in the optical glass in an amount of from 1 to 10 mol %, relative to the entire moles of the oxides.

19. The optical glass according to claim 14, wherein $Li_2O$ is present in the optical glass in an amount of from 2.3 to 6.8 mol %, relative to the entire moles of the oxides.

20. The optical glass according to claim 14, wherein $Y_2O_3$ is present in the optical glass in an amount of from 1.1 to 5.0 mol %, relative to the entire moles of the oxides.

* * * * *